(12) United States Patent
Rácz et al.

(10) Patent No.: US 10,750,384 B2
(45) Date of Patent: Aug. 18, 2020

(54) TECHNIQUE FOR REPORTING MEASUREMENTS RELATED TO RANDOM ACCESS ATTEMPTS

(71) Applicant: Telefonaktiebolaget L M Ericsson (publ), Stockholm (SE)

(72) Inventors: András Rácz, Budapest (HU); Håkan Persson, Solna (SE); Norbert Reider, Tényö (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 468 days.

(21) Appl. No.: 14/763,220

(22) PCT Filed: Jan. 25, 2013

(86) PCT No.: PCT/EP2013/051467
§ 371 (c)(1),
(2) Date: Jul. 24, 2015

(87) PCT Pub. No.: WO2014/114346
PCT Pub. Date: Jul. 31, 2014

(65) Prior Publication Data
US 2016/0127929 A1 May 5, 2016

(51) Int. Cl.
*H04L 12/26* (2006.01)
*H04W 24/08* (2009.01)
(Continued)

(52) U.S. Cl.
CPC ........... *H04W 24/08* (2013.01); *H04W 24/10* (2013.01); *H04W 74/0833* (2013.01)

(58) Field of Classification Search
None
See application file for complete search history.

(56) References Cited

U.S. PATENT DOCUMENTS 8,649,288 B2 * 2/2014 He .................... H04W 74/0833
370/252
9,491,780 B2 * 11/2016 Pang ................. H04W 74/0833
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.5.0, Mar. 2014, 1-56.
(Continued)

*Primary Examiner* — Willie J Daniel, Jr.
(74) *Attorney, Agent, or Firm* — Patent Portfolio Builders, PLLC

(57) ABSTRACT

A technique for collecting and reporting measurements related to Random Access, RA, attempts from a user equipment, UE, towards an evolved node B, eNB, is disclosed. In a first method aspect, the method is performed in the UE and comprises the steps of collecting at least one measurement from each single one of a plurality of the RA attempts, and reporting the collected measurements to one of the eNB and a management entity. In a second method aspect, the method is performed in the eNB and comprises the steps of collecting at least one measurement from each single one of a plurality of the RA attempts, and reporting the collected measurements to the management entity.

25 Claims, 8 Drawing Sheets

(51) Int. Cl.
*H04W 24/10* (2009.01)
*H04W 74/08* (2009.01)

(56) References Cited

U.S. PATENT DOCUMENTS

2010/0232318 A1* 9/2010 Sarkar ................... H04W 28/18
370/254
2011/0319115 A1 12/2011 Rácz
2012/0008524 A1* 1/2012 Amirijoo .............. H04W 24/10
370/252

OTHER PUBLICATIONS

3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)", 3GPP TS 37.320 V11.4.0, Sep. 2014, 1-23.
3GPP, "LTE; Evolved Universal Terrestrial Radio Access (E-UTRA); Radio Resource Control (RRC); Protocol specification", 3GPP TS 36.331 V11.2.0, Dec. 2012, 1-340.
Unknown, Author, "Discussion on RRC Connection Establishment log", 3GPP TSG RAN WG2 Meeting #78, R2-122141, CATT, Prague, Czech Republic, May 21-25, 2012, 1-2.
Unknown, Author, "Hybrid architecture for MDT", 3GPP TSG RAN WG2 #68, R2-096772, ZTE, Jeju, Korea, Nov. 9-13, 2009, 1-6.
Unknown, Author, "Remaining issues of LTE accessibility measurements for MDT", 3GPP TSG-RAN2 #79, R2-123250, new Postcom, Qingdao, China, Aug. 13-17, 2012, 1-4.
Office Action issued in application No. 13701762.0; dated Apr. 16, 2018; 6 pages.
Office Action issued in application No. 13701762.0 dated Apr. 9, 2019, 4 pages.

* cited by examiner

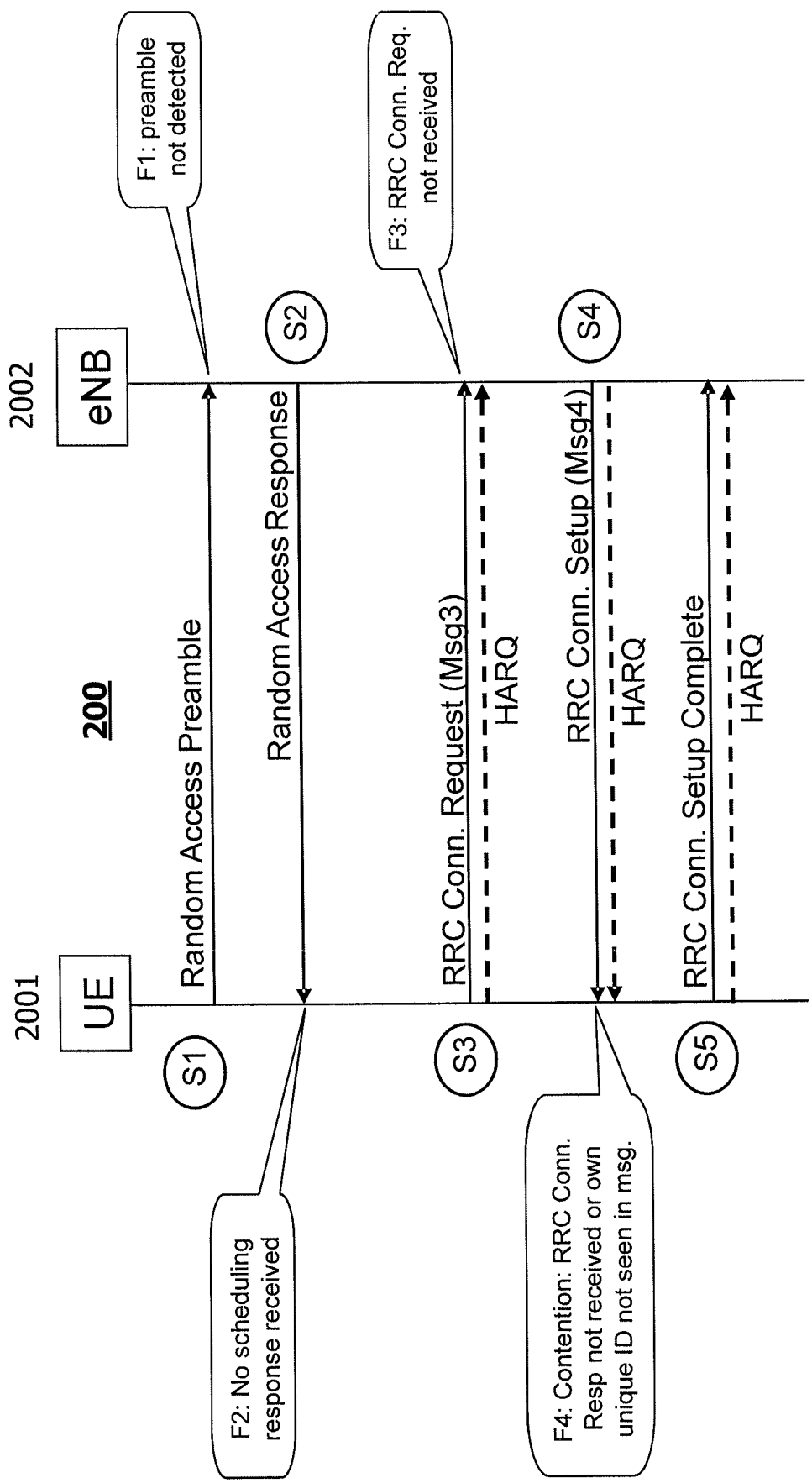

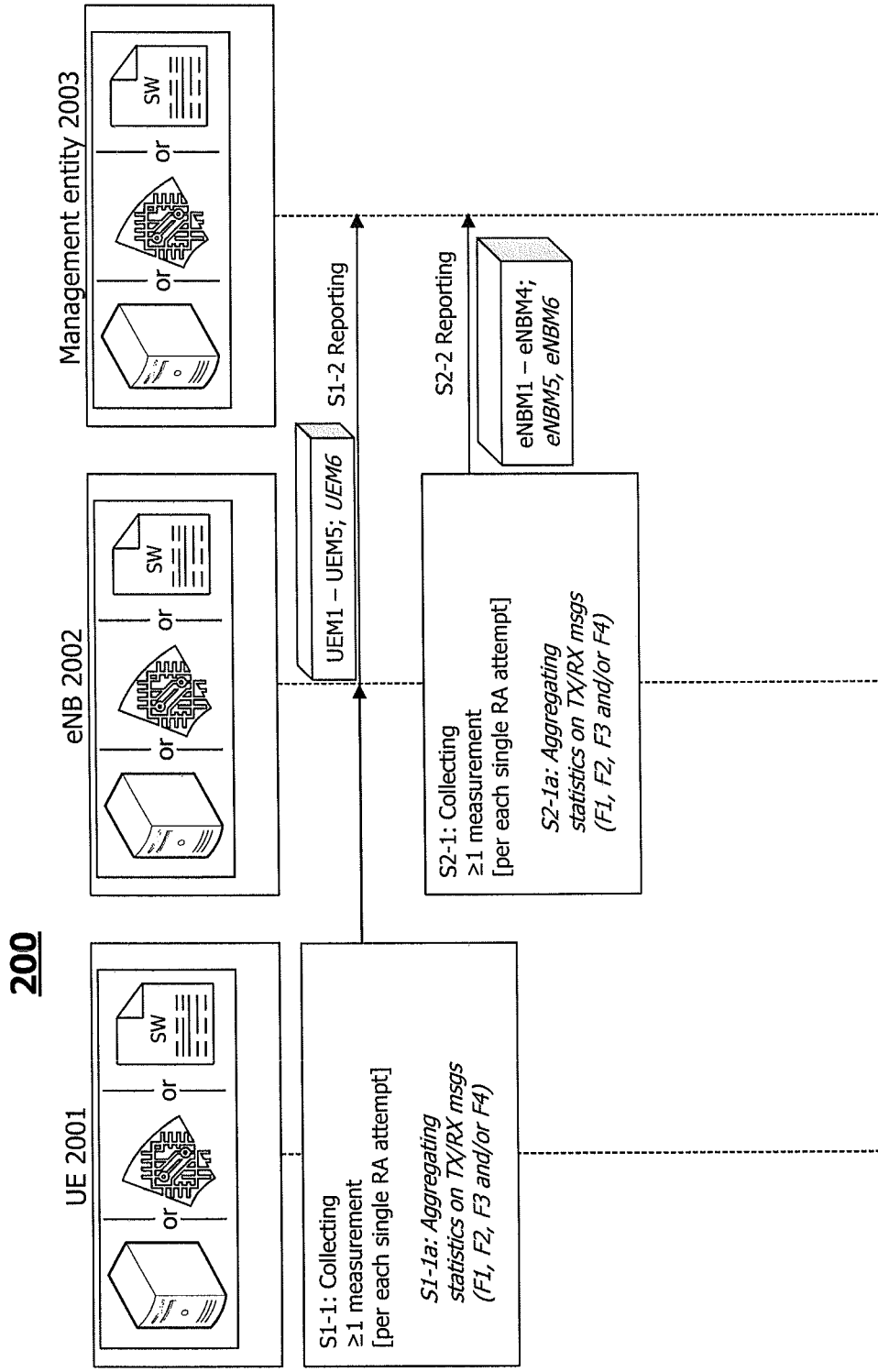

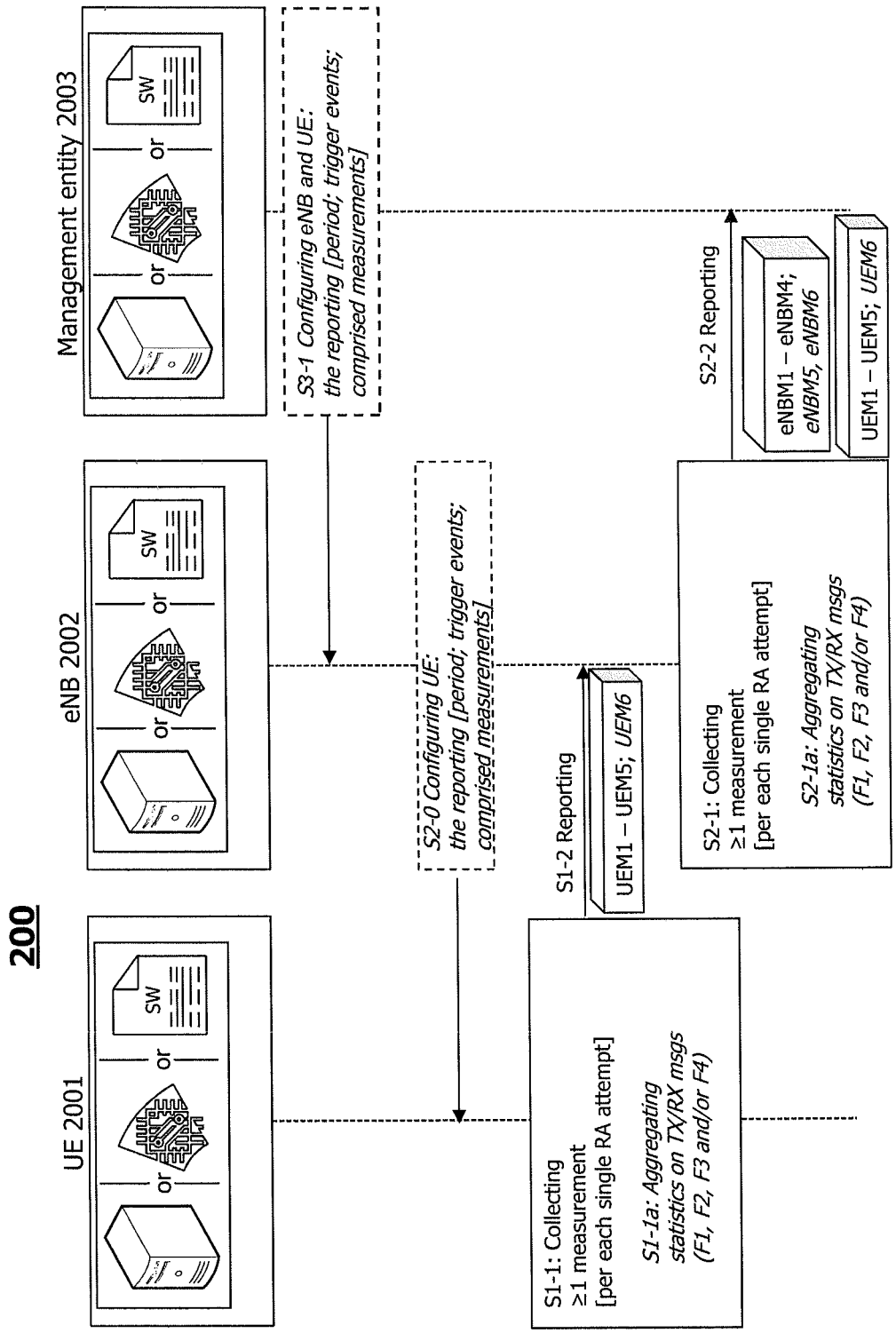

Fig. 5A

Data structure 300 *(e.g. MDT TraceJob or RRC Measurement Report)*

| | | | |
|---|---|---|---|
| UEF1 | UEM1 | nrofRAPreamblesSent | Total number of RA preambles sent by the UE since last reporting | Integer |
| UEF2 | UEM2 | nrofRAResponsesReceived | Total number of RA responses received by the UE since last reporting | Integer |
| UEF3 | UEM3 | nrofMsg3sSent | Total number of Msg3s sent by the UE since last reporting | Integer |
| UEF4 | UEM4 | nrofMsg3HARQRetransmissions | Number of HARQ retransmissions during the transmission of Msg3 | Integer |
| UEF5 | UEM5 | nrofContentionsDetected | Total number of contentions detected by the UE since last reporting | Integer |
| UEF6 | UEM6 | nrofRRCConnEstAbortedbyUE | Total number of cases when the UE aborted the establishment of the RRC connection (e.g., due to cell re-selection) | Integer |

MEM 20012; 20022

Fig. 5B

Data structure 300 *(e.g. MDT TraceJob or RRC Measurement Report)*

| | | | | |
|---|---|---|---|---|
| eNBF1 | eNBM1 | nrofRAPreamblesDetected | Total number of RA preambles detected by the eNodeB since last reporting | Integer |
| eNBF2 | eNBM2 | nrofRAResponsesSent | Total number of RA responses sent by the eNodeB since last reporting | Integer |
| eNBF3 | eNBM3 | nrofMsg3sReceivedPerUe | Number of Msg3s received by the eNodeB from a UE since last reporting | Integer |
| eNBF4 | eNBM4 | nrofMsg4sSentPerUe | Number of Msg4 messages sent by the eNodeB to a UE since last reporting | Integer |
| *eNBF5* | *eNBM5* | *nrofRRCConnCompletedReceivedPerUe* | *Number of RRC Connection Completed messages received by the eNodeB from a UE since last reporting* | *Integer* |
| *eNBF6* | *eNBM6* | *nrofRRCConnRejectSentPerUe* | *Number of RRC Connection Reject messages sent by the eNodeB towards a UE since last reporting* | *Integer* |

MEM 20012; 20022

TECHNIQUE FOR REPORTING MEASUREMENTS RELATED TO RANDOM ACCESS ATTEMPTS

TECHNICAL FIELD

The present disclosure generally relates to collecting and reporting measurements related to Random Access, RA, attempts. The RA attempts may occur from a User Equipment (UE) towards an Evolved NodeB (eNB).

BACKGROUND

An RA procedure allows a UE to access a network using the Random Access Channel (RACH). The RA procedure is part of the Medium Access Control (MAC) protocol specification.

FIG. 1 exemplarily shows the RA procedure in an exemplary Long Term Evolution (LTE) network 100 comprising a UE 1001 and an eNB 1002. In a first step S1, the UE 1001 sends an RA preamble which allows the eNB 1002, inter alia, to estimate the timing advance for the UE 1001. In step S2, the eNB 1002 transmits a scheduling RA response containing the uplink resources to be used in the next step as well as the timing estimate based on the transmission in the first step S1. The index of the detected RA preamble sequence is also sent in this message.

Step S3 comprises transmitting a Message 3 (Msg3) which contains, among others, a unique identity (ID) of the UE 1001. In step S4, a Message 4 (Msg4) is used for contention resolution, since in step S1 it is possible that multiple UEs 1001 with the same preamble had started a RA procedure. In this step S4, each UE 1001 receiving this message compares its own ID sent in step S3 to the ID inserted in Msg4. The UE 1001 that detects its own ID in Msg4 is considered as the "winner" of the RA procedure. As shown in FIG. 1, in steps S3 and S4, the messages are accompanied by a Hybrid Automatic-Repeat-Request (HARQ).

As a starting and/or triggering condition, the UE 1001 can initiate an RA procedure in several cases, such as:
Case 1: initially accessing the network when a Radio Resource Control (RRC) connection is established (i.e., the UE 1001 transits from the mode RRC_IDLE to the mode RRC_CONNECTED);
Case 2: when a handover occurs, establishing an uplink synchronization (i.e., RRC reconfiguration);
Case 3: after a radio link failure, re-establishing the RRC connection (i.e., RRC re-establishment);
Case 4: restoring an uplink synchronization when the uplink is not synchronized and the UE 1001 is in the RRC_CONNECTED mode, and uplink (UL) or downlink (DL) data arrives to be transmitted; and/or
Case 5: requesting for an UL grant for the UE 1001 having no dedicated scheduling request resource configured on the Physical Uplink Control Channel (PUCCH).

The main objective in all of the above cases 1 to 5 is to establish UL synchronization. The RA procedure also aims at assigning a unique ID to the UE 1001 when a new RRC connection is established.

However, in LTE, the terminal or UE 1001 may use contention-free RA, where the eNB 1002 allocates a dedicated RA preamble to the UE 1001 and thereby prevents contention. Thus, in this case, only steps S1 and S2 shown in FIG. 1 are applicable. The contention-free RA is supported in case of handovers or when DL data traffic has initiated the RA procedure. This type of RA is faster than the contention-based procedure, thus it is applicable in case of handovers which are time-sensitive.

In LTE, there is one measurement report that is related to the RACH procedure, namely the so-called RACH report. As defined in sections 5.5 and 5.6 of 3GPP TS 36.331, Radio Resource Control (RRC); Protocol specification, V11.2.0 of 3 Jan. 2013, the RACH report logs, inter alia:
the last successful random access attempt including both RRC setups and other RACH attempts,
a number of random access preambles sent before success, and
whether there was contention detected for any of the Msg3 transmissions.

However, the existing measurement does not report such information that could be used to measure and monitor the overall performance of RACH. The UE 1001 reports failures only for those RACH attempts that are related to RRC connection setup (i.e., it does not include RACH failures once in RRC_CONNECTED mode). Furthermore, the eNB 1002 does not report similar RACH related measurements that could help identifying root causes of different RACH failures.

SUMMARY

Accordingly, there is a need for an implementation of a collecting and reporting technique that avoids one or more of the problems discussed above, or other related problems.

In a first aspect, there is provided a method for collecting and reporting measurements related to Random Access, RA, attempts from a user equipment, UE, towards an evolved node B, eNB, wherein the method is performed in the UE and comprises the steps of collecting at least one measurement from each single one of a plurality of the RA attempts, and reporting the collected measurements to one of the eNB and a management entity.

In one exemplary implementation, RACH related measurements in 3GPP and other systems including UTRAN and E-UTRAN can thus be provided. The measurement reports may include not only the RRC connection setup related RACH failures. The enhanced information may be sufficient to make a complete root cause analysis of RACH problems and facilitate execution of corresponding correction and optimization actions.

In a first refinement of the first aspect, the management entity may be different from the UE and the eNB. In addition or alternatively, the collecting step may be performed separately depending on an initiation event that initiated the single RA attempt.

The collecting step may comprise aggregating statistics on transmitted and received messages in the single RA attempt. If so, the aggregated statistics may further comprise reports on at least one of the following failure conditions: a first failure condition indicating that the eNB has been unable to detect a transmitted RA preamble, a second failure condition indicating that the UE has been unable to receive a scheduling request in response to a transmitting RA preamble, a third failure condition indicating that the eNB has been unable to receive a message 3, Msg3, containing a unique identifier (ID) of the UE, and a fourth failure condition indicating that the UE has been unable detect the own unique ID of the UE in a received message 4, Msg4, or has been unable to receive the msg4.

In a second refinement of the first aspect, the at least one measurement collected for the single RA attempt comprises at least one of a first UE measurement of a total number of RA preambles transmitted by the UE since the last reporting step having been performed, a second UE measurement of a total number of RA responses received by the UE since the last reporting step having been performed, a third UE measurement of a total number of messages 3, Msg3s, containing a unique identifier (ID) of the UE transmitted by the UE since the last reporting step having been performed, a fourth UE measurement of a total number of HARQ re-transmissions having occurred during transmission of the Msg3s, and a fifth UE measurement of a total number of contentions detected by the UE since the last reporting step having been performed. In this way, RACH performance monitoring is enabled.

In a third refinement of the first aspect, in case of the single RA attempt being a contention-free RA attempt, the at least one measurement collected for the single RA attempt comprises at least one of a first UE measurement of a total number of RA preambles transmitted by the UE since the last reporting step having been performed, and a second UE measurement of a total number of RA responses received by the UE since the last reporting step having been performed.

In the second or third refinement of the first aspect, the reporting step may be performed periodically. Alternatively, the reporting step may be performed in response to a reporting event having occurred. In the latter case, the reporting event may comprise at least one of a predetermined number of measurements having been collected, an imminent handover of the UE having been detected, and a handover measurement having been transmitted. Moreover, the reporting step may be performed using one of a UEInformationTransfer procedure, and a Radio Resource Control, RRC, Measurement Report procedure utilizing added Information Elements, IEs. Still further, the RA attempts may be performed when an RRC connection has been established between the UE and the eNB, and wherein the at least one measurement collected for the single RA attempt further comprises a sixth UE measurement of a total number of abortions of RRC connection establishment. In this way, measurements are logged each time an RRC connection is initiated.

In a fourth refinement of the first aspect, the method may further comprise receiving, from the eNB, configuration information so as to configure the reporting of the UE in terms of at least one of a periodicity of the reporting, triggering events of the reporting, and measurements comprised in the reporting. If so, the Msg3 may consist of or comprise an RRC Connection Request message. Furthermore, collecting and reporting steps may be performed each time an RRC connection setup is performed.

In a second aspect, there is provided a method for collecting and reporting measurements related to Random Access, RA, attempts from a user equipment, UE, towards an evolved node B, eNB, wherein the method is performed in the eNB and comprises the steps of collecting at least one measurement from each single one of a plurality of the RA attempts, and reporting the collected measurements to a management entity.

In a first refinement of the second aspect, the management entity is different from the UE and the eNB. In addition or alternatively, the collecting step may be performed separately depending on an initiation event that initiated the single RA attempt. Moreover, the collecting step may further comprise aggregating statistics on transmitted and received messages in the single RA attempt. If so, the aggregated statistics may further comprise reports on at least one of the following failure conditions a first failure condition indicating that the eNB has been unable to detect a transmitted RA preamble, a second failure condition indicating that the UE has been unable to receive a scheduling request in response to a transmitting RA preamble, a third failure condition indicating that the eNB has been unable to receive a message 3, Msg3, containing a unique identifier, ID, of the UE, and a fourth failure condition indicating that the UE has been unable detect the own unique ID of the UE in a received message 4, msg4, or has been unable to receive the msg4. In this way, appropriate triggers for the aggregation of information on the RA attempts can be provided.

In a second refinement of the second aspect, the at least one measurement collected for the single RA attempt comprises at least one of a first eNB measurement of a total number of RA preambles detected by the eNB since the last reporting step having been performed, a second eNB measurement of a total number of RA responses transmitted by the eNB since the last reporting step having been performed, a third eNB measurement of a total number of messages 3, Msg3s, containing a unique identifier, ID, of the UE received by the eNB since the last reporting step having been performed, and a fourth eNB measurement of a total number of transmitted messages 4, Msg4s, comprising another unique ID inserted by the eNB since the last reporting step having been performed.

In a third refinement of the second aspect, in case of the single RA attempt being a contention-free RA attempt, the at least one measurement collected for the single RA attempt comprises at least one of a first eNB measurement of a total number of RA preambles detected by the eNB since the last reporting step having been performed, and a second eNB measurement of a total number of RA responses transmitted by the eNB since the last reporting step having been performed. In this way, system resources may be saved on in a non-competitive RA situation.

In a fourth refinement of the second aspect, the collecting step is performed with a period identical to a reporting period of the UE. The eNB may collect also the measurements performed by the UE prior to sending one concentrated measurement report covering both the UE and the eNB to the management entity.

In a fifth refinement of the second aspect, the method further comprises configuring the reporting of the UE in terms of at least one of a periodicity of the reporting, triggering events of the reporting, and measurements comprised in the reporting. If so, the configuring step may utilize a Radio Resource Control, RRC, Connection Reconfiguration message. In addition, the configuring step may be performed utilizing a Minimization of Drive Tests MDT TraceJob configuration procedure. Still further, the method may further comprise, prior to configuring the reporting of the UE, receiving information from the management entity defining the at least one of the periodicity of the reporting, triggering events of the reporting, and measurements comprised in the reporting.

In a sixth refinement of the second aspect, the aggregating step and reporting step may be performed once per one of UE context, and cell statistics.

In a seventh refinement of the second aspect, the reporting step may report the measurements in a trace record of an MDT trace procedure. If so, the reporting step may be performed as a part of an MDT TraceJob. In this way, existing resources are re-used efficiently.

In an eighth refinement of the second aspect, the RA attempts are performed when an RRC connection has been established between the UE and the eNB. The at least one measurement collected for the single RA attempt may further comprise at least one of a fifth eNB measurement of a total number of RRC Connection Completed messages received by the eNB from the UE since the last reporting step having been performed, and a sixth eNB measurement of a total number of RRC Connection Reject messages transmitted from the eNB to the UE since the last reporting step having been performed. If so, the msg4 may consist of or comprise an RRC Connection Setup message. In addition, the collecting and reporting steps may be performed each time an RRC connection setup is performed.

Moreover, when combining the respective second refinements of the first and second aspects, the aggregated statistics may comprise at least one of a percentage of successful preamble detections, being a quotient of the first UE measurement summed for all UEs in a cell divided by the first eNB measurement, a percentage of successful preamble transmissions per cell, being a quotient of the first UE measurement summed for all UEs in a cell divided by the second eNB measurement, a percentage of contentions detected per UE, being a quotient of the fourth eNB measurement divided by the fifth UE measurement, and a percentage of contentions detected per cell, being a quotient of the fourth eNB measurement summed for all UEs in a cell divided by the fifth UE measurement summed for all UEs in the cell. It thus becomes possible to perform a root cause analysis of different RACH failures.

In a third aspect, there is provided a computer program product comprising program code portions for performing the method of any one of the first and second aspects when the computer program product is executed on one or more computing devices. The computer program product may be stored on a computer readable recording medium.

In a fourth aspect, there is provided a User Equipment, UE, for reporting measurements related to Random Access, RA, attempts from the UE towards an evolved node B, eNB, comprising a processor configured to collect at least one measurement from each single one of a plurality of the RA attempts, and to report the collected measurements to one of the eNB and a management entity.

In a fifth aspect, there is provided an evolved Node B, eNB, for reporting measurements related to Random Access, RA, attempts from a User Equipment, UE, towards the eNB, comprising a processor configured to collect at least one measurement from each single one of a plurality of the RA attempts, and to report the collected measurements to a management entity.

In a sixth aspect, there is provided a data structure for storing measurements related to Random Access, RA, attempts from a user equipment, UE, towards an evolved node B, eNB, the data structure comprising at least one field configured to store at least one measurement from each single one of a plurality of the RA attempts, the data structure serving as a container for subsequent reporting to a management entity.

In first refinement of the sixth aspect, the at least one field comprises at least one of a first UE field configured to store a first UE measurement of a total number of RA preambles transmitted by the UE since the last reporting step having been performed, a second UE field configured to store a second UE measurement of a total number of RA responses received by the UE since the last reporting step having been performed, a third UE field configured to store a third UE measurement of a total number of messages 3, Msg3s, containing a unique identifier (ID) of the UE transmitted by the UE since the last reporting step having been performed, a fourth UE field configured to store a fourth UE measurement of a total number of HARQ re-transmissions having occurred during transmission of the Msg3s, a fifth UE field configured to store a fifth UE measurement of a total number of contentions detected by the UE since the last reporting step having been performed, and a sixth UE field configured to store a sixth UE measurement of a total number of abortions of RRC connection establishment.

In a second refinement of the sixth aspect, the at least one field comprises at least one of a first eNB field configured to store a first eNB measurement of a total number of RA preambles detected by the eNB since the last reporting step having been performed, a second eNB field configured to store a second eNB measurement of a total number of RA responses transmitted by the eNB since the last reporting step having been performed, a third eNB field configured to store a third eNB measurement of a total number of messages 3, Msg3s, containing a unique identifier, ID, of the UE received by the eNB since the last reporting step having been performed, a fourth eNB field configured to store a fourth eNB measurement of a total number of transmitted messages 4, Msg4s, comprising another unique ID inserted by the eNB since the last reporting step having been performed, a fifth eNB field configured to store a fifth eNB measurement of a total number of RRC Connection Completed messages received by the eNB from the UE since the last reporting step having been performed, and a sixth eNB field configured to store a sixth eNB measurement of a total number of RRC Connection Reject messages transmitted from the eNB to the UE since the last reporting step having been performed.

In the first and second refinements of the sixth aspect, the data structure may comprise an RRC Measurement Report comprising at least the UE fields. Alternatively, the data structure may comprise one of MDT TraceRecord comprising at least the UE fields and the eNB fields.

Still further, it is to be noted that the method aspects may also be embodied on the apparatus of the fourth and fifth aspects comprising at least one processor and/or appropriate functionality for carrying out any one of the method steps.

BRIEF DESCRIPTION OF THE DRAWINGS

The embodiments of the technique presented herein are described herein below with reference to the accompanying drawings, in which:

FIG. 2B shows possible failure cases during contention-based RA procedure in LTE when the RRC connection is established;

FIG. 4A shows a method embodiment which also reflects the interaction between the components of the device embodiment;

FIG. 4B shows a modified method embodiment which also reflects the interaction between the components of the device embodiment;

FIG. 5A shows a first part of a data structure embodiment; and

FIG. 5B shows a second part of a data structure embodiment.

DETAILED DESCRIPTION

In the following description, for purposes of explanation and not limitation, specific details are set forth (such as particular signaling steps) in order to provide a thorough understanding of the technique presented herein. It will be apparent to one skilled in the art that the present technique may be practiced in other embodiments that depart from these specific details. For example, the embodiments will primarily be described in the context of LTE; however, this does not rule out the use of the present technique in connection with other communication technologies consistent with the RA procedure, such as LTE-Advanced.

As understood herein, the term UE generally denotes a user device such as a mobile telephone, smartphone, tablet computer, wireless network card and so on. In a similar manner the term eNB generally denotes a base station or similar network node to which the UE can attach, via an air interface or otherwise.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 1:
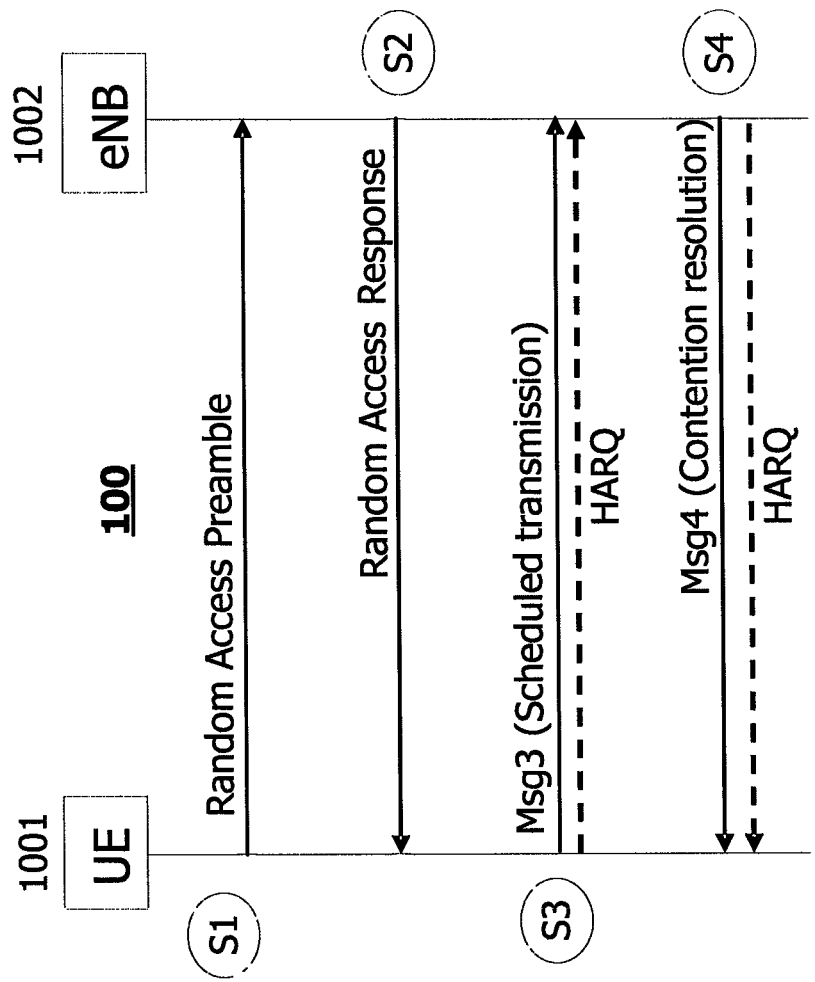
FIG. 1 shows the contention-based random access procedure in LTE.
Figure 2A:
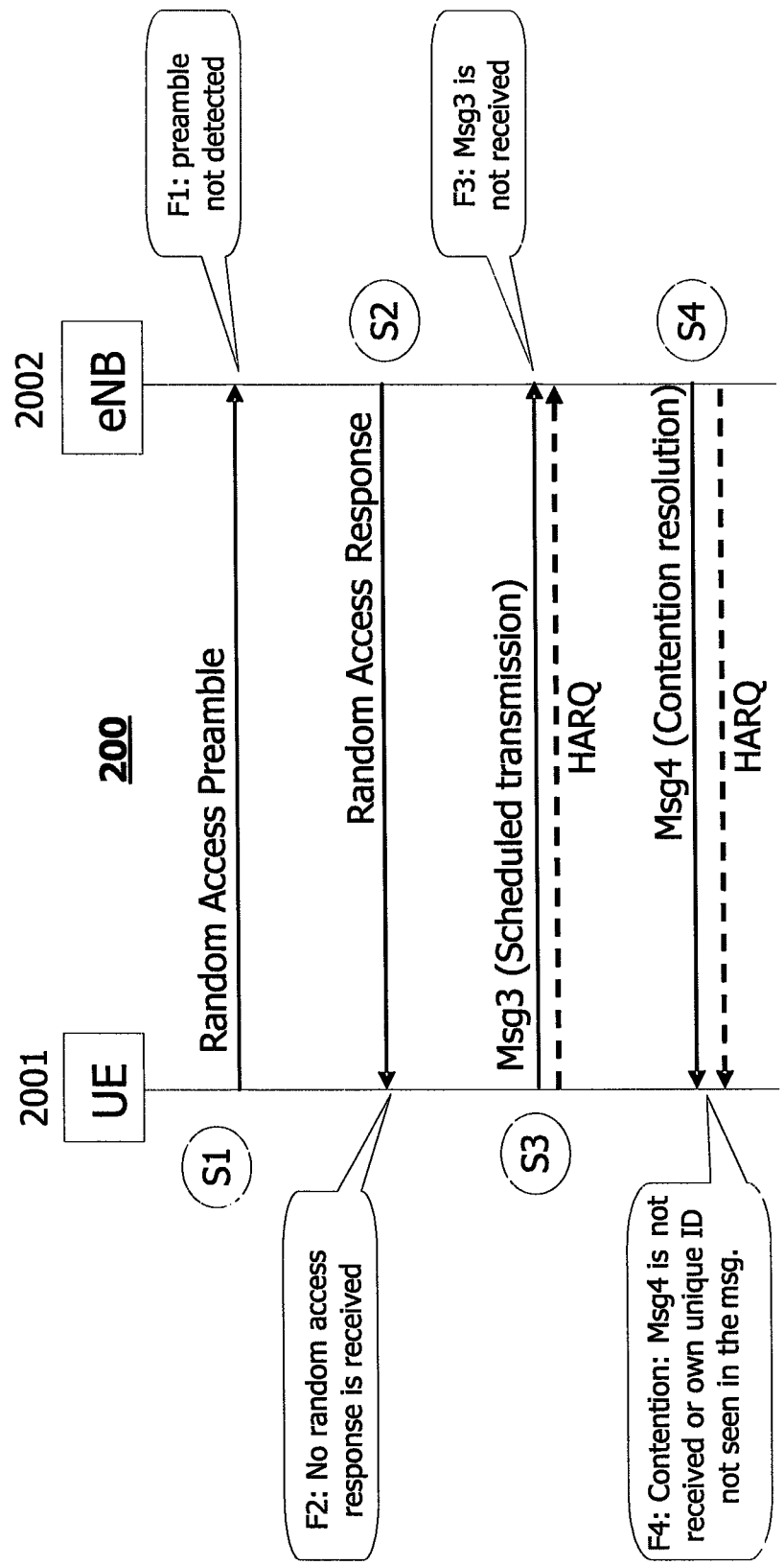
FIG. 2A shows possible failure cases during the message sequence of the contention-based RA procedure.

FIG. 2A shows possible failure cases during the message sequence of the contention-based RA procedure, and FIG. 2B shows possible failure cases during the contention-based RA procedure in LTE when the RRC connection is established. It is to be noted that the failure cases shown in FIGS. 2A and 2B may act as triggers for reporting measurements related to RA attempts from a UE 2001 towards an eNB 2002, both comprised in a cellular network 200.

FIG. 2A illustrates the possible failure cases during the message sequence of the contention-based RA procedure. It is possible that the eNB 2002 cannot detect the transmitted random access preamble in step S1, for example because of the low signal level received or collision with another UE using the same slot for transmission, referred to as failure F1. In step S2, failure F2 corresponds to the case when the UE 2001 does not receive the scheduling request in reply to the preamble sent in step S1. In step S3, failure F3 can occur at the eNB 2002 when the eNB 2002 does not receive Msg3. Finally, in step S4, failure F4 resides in contention being detected when the UE's 2001 own ID is not detectable in the message Msg4, or the message Msg4 is not received at all.

FIG. 2B illustrates the case (see case 1 described above) when an RRC Connection Request message indicates the RA to include some possible failure cases. In step S3, the message Msg3 consists of an RRC Connection Request message. In step S4, the RRC Connection Setup is used for contention resolution. Then, in step S5, the UE 2001 that "won" the contention transmits an acknowledgement to the eNB 2002 in the RRC Connection Setup Complete message.

As for additional possible failure cases in the case of an RRC connection establishment, the network 200 may reject the RRC Connection Request message sent in step S3, and in this case, RRC Connection Reject is sent to the UE 2001 instead of the RRC Connection Setup message.

In LTE, the an RRC failure report may contain, inter alia, information on the last unsuccessful RRC attempt which is reported when the UE 2001 successfully established an RRC connection, the latest available radio measurements (Reference Signal Received Power/Reference Signal Received Quality (RSRP/RSRQ) measurements), the respective serving cell ID, detailed location information if available, the number of RA preambles transmitted by the UE 2001, the number of cases when the RRC Connection Request (e.g. Msg3) is sent, whether the maximum transmission power is used, and whether contention is detected in step S4 of FIG. 2A, that is, Msg3 is sent but no response received by the terminal or different ID is observed in the RRC Connection Response message.

Figure 3:
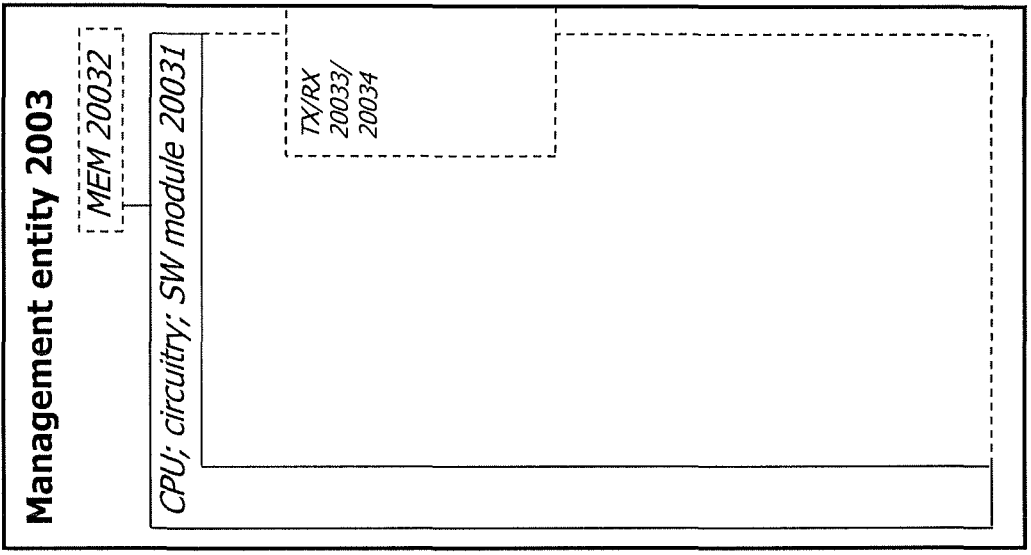
FIG. 3 shows components comprised in an exemplary device embodiment realized in the form of a UE, an eNB or a management entity.
Figure 3:
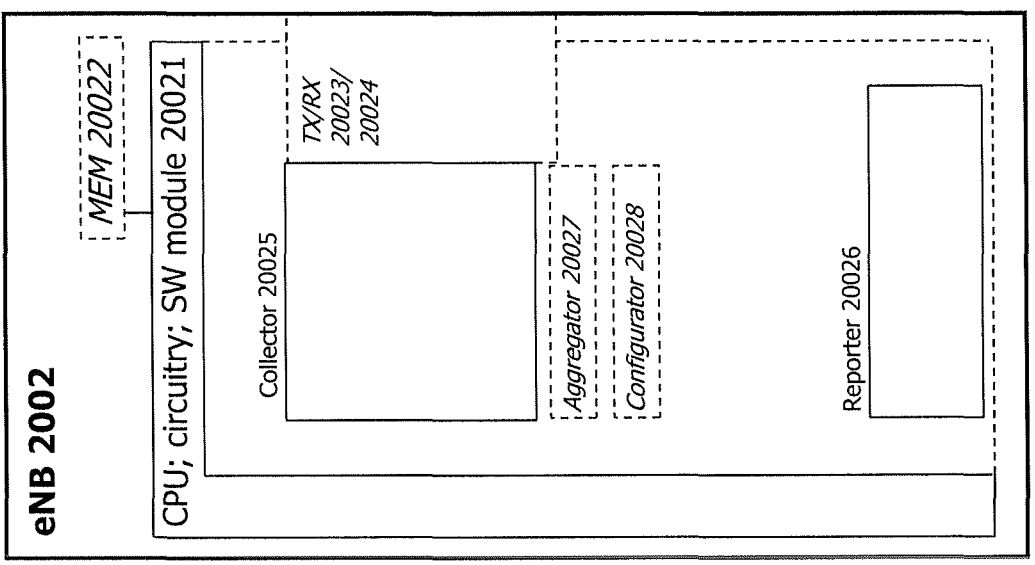
Figure 3:
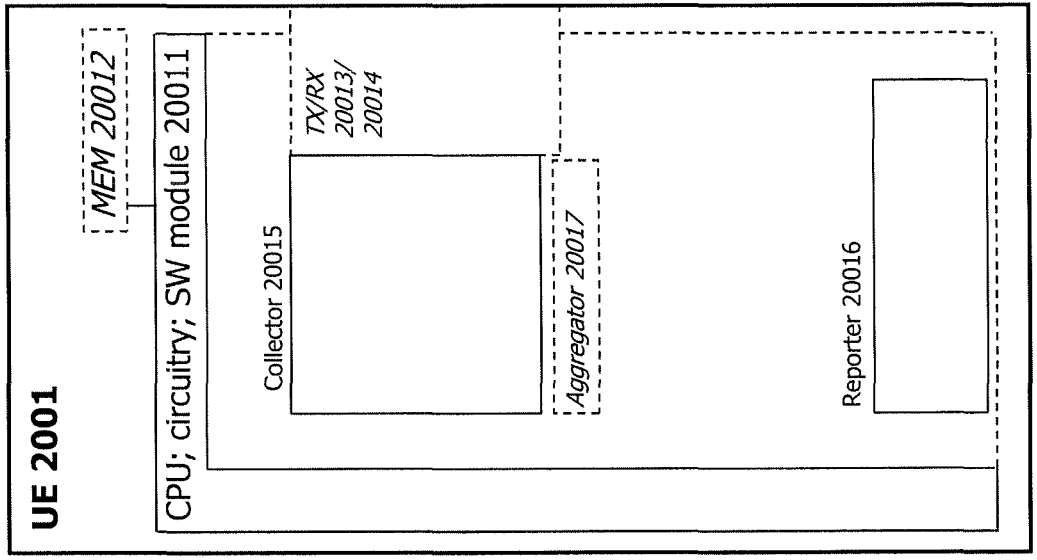

FIG. 3 shows components comprised in exemplary device embodiment realized in the form of the UE 2001, the eNB 2002 and a management entity 2003. As shown in FIG. 3, the UE 2001 comprises a core functionality (e.g., one or more of a Central Processing Unit (CPU), dedicated circuitry and/or a software module) 20011, an optional memory (and/or database) 20012, an optional transmitter 20013 and an optional receiver 20014. Moreover, the UE 2001 comprises a collector 20013, a reporter 20016 and an optional aggregator 20017.

In turn, the eNB 2002 comprises a core functionality (e.g., one or more of a Central Processing Unit (CPU), dedicated circuitry and/or a software module) 20021, an optional memory (and/or database) 20022, an optional transmitter 20023 and an optional receiver 20024. Moreover, the eNB 2002 comprises a collector 20025, a reporter 20026, an optional aggregator 20027 and an optional configurator 20028.

Finally, management entity 2003 comprises a core functionality (e.g., one or more of a Central Processing Unit (CPU), dedicated circuitry and/or a software module) 20031, an optional memory (and/or database) 20032, an optional transmitter 20033 and an optional receiver 20034.

In the following paragraphs, assume that x=1, 2 or 3. As partly indicated by the dashed extensions of the functional block of the CPUs $200x1$, the collector 20015, the reporter 20016 and the aggregator 20017 (of the UE 2001), the collector 20025, the reporter 20026, the aggregator 20027 and the configurator 20028 (of the eNB 2002) as well as the memory $200x2$, the transmitter $200x3$ and the receiver $200x4$ may at least partially be functionalities running on the CPUs $200x2$, or may alternatively be separate functional entities or means controlled by the CPUs $200x1$ and supplying the same with information. The transmitter and receiver components $200x3$, $200x4$ may be realized to comprise suitable interfaces and/or suitable signal generation and evaluation functions.

The CPUs $200x1$ may be configured, for example, using software residing in the memories $200x2$, to process various data inputs and to control the functions of the memories $200x2$, the transmitter $200x3$ and the receiver $200x3$ (as well as the collector 20015, the reporter 20016 and the aggregator 20017 (of the UE 2001), the collector 20025, the reporter 20026, the aggregator 20027 and the configurator 20028 (of the eNB 2002)). The memory $200x2$ may serve for storing program code for carrying out the methods according to the aspects disclosed herein, when executed by the CPUs $200x1$.

It is to be noted that the transmitter $200x3$ and the receiver $200x4$ may be provided as an integral transceiver, as is indicated in FIG. 3. It is further to be noted that the transmitters/receivers 20013, 20014 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the above-described collector 20015, the reporter 20016 and the aggregator 20017 (of the UE 2001), the collector 20025, the reporter 20026, the aggregator 20027 and the configurator 20028 (of the eNB 2002), or the respective functionalities, may also be implemented as a chipset, module or subassembly.

FIG. 4A shows a method embodiment which also reflects the interaction between the components of the device embodiment. In the signaling diagram of FIG. 4A, time aspects between signaling are reflected in the vertical arrangement of the signaling sequence as well as in the sequence numbers. It is to be noted that the time aspects indicated in FIG. 4A do not necessarily restrict any one of the method steps shown to the step sequence outlined in FIG. 4A. This applies in particular to method steps that are functionally disjunctive with each other. For instance, the collecting and the reporting steps S1-1 and S1-2 are shown to take place in time before the collecting and the reporting steps S2-1 and S2-2; however, this does not preclude that the steps are carried out in reverse order or (substantially) simultaneously.

Turning to the UE 2001, in step S1-1, the collector 20015 of the UE 2001 performs collecting at least one measurement from each single one of a plurality of the RA attempts. As an option, the collecting step may be performed separately depending on an initiation event that initiated the single RA attempt; as described earlier, the failure conditions F1 to F4 shown in FIG. 2A and/or FIG. 2B may act as such initiation events.

As an option, in step S1-1a, the aggregator 20017 of the UE 2001 may perform aggregating statistics on transmitted and received messages in the single RA attempt. The aggregated statistics may further comprise reports on at least one of the following failure conditions: the first failure condition F1 indicating that the eNB has been unable to detect a transmitted RA preamble, the second failure condition F2 indicating that the UE has been unable to receive a scheduling request in response to a transmitting RA preamble, the third failure condition F3 indicating that the eNB has been unable to receive a message 3, Msg3, containing a unique identifier, ID, of the UE, and/or the fourth failure condition F4 indicating that the UE has been unable detect the own unique ID of the UE in a received message 4, msg4, or has been unable to receive the msg4.

Then, in step S1-2, the reporter 20016 of the UE 2001 performs reporting the collected measurements to the eNB 2002 or the management entity 2003. For clarity, the management entity may be different from the UE and the eNB; that is, the eNB 2002 may be functionally co-located with the management entity 2003 (e.g., within the same server) or they may be separate entities. Moreover, the UE 2001 may report to the management entity 2003 directly or via the eNB 2002.

That is, based for example on the failure cases F1 to F4 shown in FIGS. 2A and 2B, the following measurements in the UE 2002 are to be logged during each RA attempt (not only last incident).

Namely, as also shown in FIG. 5A, the at least one measurement collected for the single RA attempt may comprise at least one of a first UE measurement UEM1 of a total number of RA preambles transmitted by the UE since the last reporting step having been performed, a second UE measurement UEM2 of a total number of RA responses received by the UE since the last reporting step having been performed, a third UE measurement UEM3 of a total number of messages 3, Msg3s, containing a unique identifier, ID, of the UE transmitted by the UE since the last reporting step having been performed, a fourth UE measurement UEM4 of a total number of HARQ re-transmissions having occurred during transmission of the Msg3s, and a fifth UE measurement UEM5 of a total number of contentions detected by the UE since the last reporting step having been performed.

As a special case, in case of the single RA attempt being a contention-free RA attempt, the at least one measurement collected for the single RA attempt comprises at least one of the first UE measurement UEM1 and the second UE measurement UEM2 described above.

In other words, in case of contention-free RA, only those measurements that can be logged during the first two steps of the RA procedure (see steps S1 and S2 in FIG. 2A), such as:

nrofRAPreamblesSent (UEM1)
nrofRAResponsesReceived (UEM2)
nrofRAPreamblesDetected (eNBM1)
nrofRAResponsesSent (eNBM2).

In both cases, the reporting step S1-1 may be performed periodically. Alternatively, the reporting step S1-1 may be performed in response to a reporting event having occurred. In the latter case, the reporting event may comprise at least one of a predetermined number of measurements having been collected, an imminent handover of the UE having been detected, and a handover measurement having been transmitted.

In other words, two options are proposed to report these measurements UEM1 to UEM6:

Option-1: the UE 2001 reports periodically and the eNB 2002 reports (substantially) with the same periodicity as the UE;

Option-2: the UE 2001 is requested to report the measurements UEM1 to UEM6 to the network 200 (i.e., the management entity 2003) when an event is triggered, for instance, when a certain number of samples has been collected or before a handover has occurred (e.g., when handover measurement is sent).

Furthermore, the reporting step may be performed using one of a UEInformationTransfer procedure; and a Radio Resource Control, RRC, Measurement Report procedure utilizing added Information Elements, IEs.

In other words, for the purpose of reporting by the UE, the UEInformationTransfer procedure may be used. Optionally, the same IEs may be added to a regular RRC Measurement Report to enable transfer of RACH measurements (e.g., with the handover measurements at the same time).

As a special case, the RA attempts may be performed when an RRC connection has been established between the UE 2001 and the eNB 2002. If so, the at least one measurement collected for the single RA attempt for the UE 2001 may further comprise a sixth UE measurement UEM6 of a total number of abortions of RRC connection establishment.

In turn, the at least measurement collected for the single RA attempt for the eNB 2002 comprises at least one of a first eNB measurement eNBM1 of a total number of RA preambles detected by the eNB since the last reporting step having been performed, and a second eNB measurement eNBM2 of a total number of RA responses transmitted by the eNB since the last reporting step having been performed.

In that case, the Msg3 may consist of an RRC Connection Request message; the collecting and reporting steps may be performed each time an RRC connection setup is performed.

Now turning to the eNB 2002, in step S2-1, the collector 20025 of the eNB 2002 performs collecting at least one measurement from each single one of a plurality of the RA attempts. Optionally, the collecting step may be performed separately depending on an initiation event that initiated the single RA attempt (the initiation event may be one of the failure conditions depicted in FIGS. 2A and 2B).

Still further, in an optional step S2-1a, the aggregator 20027 of the eNB 2002 performs aggregating statistics on transmitted and received messages in the single RA attempt. Further, the aggregated statistics may further comprise reports on at least one of the above-described failure conditions F1 to F4 (as depicted in conjunction with FIGS. 2A and 2B).

Further, in step S2-2, the reporter 20026 of the eNB 2002 performs reporting the collected measurements to the management entity 2003. As stated above, the management entity may be different from the UE 2001 and the eNB 2002.

Still further, the above measurements UEM1 to UEM5, as well as the measurements eNBM1 to eBNM6 described below may be performed separately depending on the action that initiated the RA procedure (see cases 1 to 5 described above). In this way, the present disclosure enables to find root causes of different RACH failures and to identify the corresponding higher layer actions.

Moreover, as also described in conjunction with FIG. 5B, the at least one measurement collected for the single RA attempt for the eNB 2002 may comprise at least one of a first eNB measurement eNBM1 of a total number of RA preambles detected by the eNB since the last reporting step having been performed, a second eNB measurement eNBM2 of a total number of RA responses transmitted by the eNB since the last reporting step having been performed, a third eNB measurement eNBM3 of a total number of messages 3, Msg3s, containing a unique identifier, ID, of the UE received by the eNB since the last reporting step having been performed, and a fourth eNB measurement eNBM4 of a total number of transmitted messages 4, Msg4s, comprising another unique ID inserted by the eNB since the last reporting step having been performed.

It is noted that the (UE and eNB) measurements are altogether optional to be implemented. However, some of them might be considered as particularly important, such as nrofRAPreamblesSent (UEM1)
nrofRAPreamblesDetected (eNBM1)
nrofRAResponsesReceived (UEM2)
nrofContentionsDetected (eNBM2)

As stated above, the collecting step S2-1 may be performed with a period identical to a reporting period of the UE 2001. Still further, the aggregating step and reporting step may be performed once per one of UE context and cell statistics.

In other words, the eNB 2002 may perform the aggregation of the measurements as follows:

Option-1: The eNB 2002 may report the measurements per UE context (that is, no aggregation step S2-1a needs to be performed in the eNB 2002). Optionally, the UE 2001 measurements may be correlated with eNB 2002 side measurements.

Option-2: The eNB 2002 may aggregate the per-UE 2001 reports as well as the eNB's own measurements to cell level creating per cell statistics (e.g., total number of preambles sent UEM1, total number of preambles detected eNBM1, etc.).

As a further option, the reporter 20026 may perform the reporting step S2-2 so as to report the measurements in a trace record of an MDT, trace procedure. If so, the reporting step may be performed as a part of an MDT TraceJob.

In other words, the eNB 2002 may log the collected measurements in trace records and send them in trace files to a Trace Collection Entity (TCE) and/or may produce counters and Key Performance Indicators (KPIs) via aggregation of these measurements and report them as Performance Management (PM) measures. When the proposed measurements are collected via an MDT trace procedure, the reporting of these measurements should be possible to request via Interface N (Itf-N) as a part of the TraceJob configuration. New IEs corresponding to the proposed RACH measurements may be added as further attributes of the MDT TraceJob.

As a special case, as stated above, the RA attempts may be performed when the RRC connection has been established between the UE 2001 and the eNB 2002. If so, the at least one measurement collected for the single RA for the eNB 2002 attempt may further comprises at least one of a fifth eNB measurement eNBM5 of a total number of RRC Connection Completed messages received by the eNB from the UE since the last reporting step having been performed, and a sixth eNB measurement eNBM6 of a total number of RRC Connection Reject messages transmitted from the eNB to the UE since the last reporting step having been performed.

In this connection, the msg4 may consist of an RRC Connection Setup message. Moreover, the collecting and reporting steps may be performed each time an RRC connection setup is performed.

When combining the measurements UEM1 to UEM6 from the UE 2001 and the measurements eNBM1 to eNBM6 from the eNB 2002, the following useful performance and failure statistics can be derived. Note that the correlation of measurements may be assumed in the eNB 2002 or in the management entity 2003.

That is, the aggregated statistics may comprise a percentage of successful preamble detections, being a quotient of the first UE measurement UEM1 summed for all UEs in a cell divided by the first eNB measurement eNBM1.

In other words, a percentage of successful preamble detection in Cell-I may be expressed as follows:

$$M1 = \frac{\sum_{\forall UE\ in\ Cell-l} nrofRAPreamblesSent}{nrofRAPreamblesDetected} \cdot 100[\%]$$

This can be an indication either of a lack of RACH detection in the eNB (e.g., number of detected preambles>>number of sent preambles) or false detections (e.g., number of detected>number of sent).

That is, the aggregated statistics may comprise a percentage of successful preamble transmissions per cell, being a quotient of the first UE measurement UEM1 summed for all UEs in a cell divided by the second eNB measurement eNBM2.

In other words, the percentage of successful preamble transmission per cell may be expressed as follows:

$$M2 = \frac{nrofRAPreamblesSent}{nrofRAResponsesReceived} \cdot 100[\%]$$

A low value of M2 (but a concurrently high value of M1) can be an indication of UL coverage problems for the UE in question (e.g., preamble transmitted with too low power).

The aggregated statistics may comprise a percentage of contentions detected per cell, being a quotient of the fourth eNB measurement eNBM4 summed for all UEs in a cell divided by the fifth UE measurement eNBM5 summed for all UEs in the cell.

In other words, the percentage of contentions detected in Cell-I may be expressed as follows:

$$M3 = \frac{\sum_{\forall UE\, in\, Cell-l} nrofMsg4sSentPerUe}{\sum_{\forall UE\, in\, Cell-l} nrofContentionsDetected} \cdot 100[\%]$$

The aggregated statistics may comprise a percentage of contentions detected per UE, being a quotient of the fourth eNB measurement eNBM4 divided by the fifth UE measurement UEM5.

In other words, the percentage of contentions detected per UE may be expressed as follows:

$$M4 = \frac{nrofMsg4sSentPerUe}{nrofContentionsDetected} \cdot 100[\%]$$

In other words, the percentage of contention can also be calculated per UE 2001 as well. Comparing M2 and M3, it could be determined whether RACH failures are due to preamble detection problems (e.g., UL coverage) or due to UE collision.

FIG. 4B shows a modified method embodiment which also reflects the interaction between the components of the device embodiment.

More precisely, FIG. 4B shows two optional preparatory steps S3-1 and S2-0 so as to configure the subsequent reporting steps S1-2 and S2-2. That is, in an optional step S2-0, the configurator 20027 of the eNB 2002 performs configuring the reporting of the UE 2002 in terms of at least one of a periodicity of the reporting, triggering events of the reporting, and measurements comprised in the reporting.

As an option, the configuring step S2-0 may utilize a RRC Connection Reconfiguration message. The configuring step may be preceded by receiving, at the UE 2001 from the eNB 2002, configuration information so as to configure the reporting of the UE in terms of at least one of a periodicity of the reporting, triggering events of the reporting, and measurements comprised in the reporting. In addition or alternatively, the configuring step S2-0 may be performed utilizing an MDT TraceJob configuration procedure.

Still further, the receiver 20024 of the UE may perform, in step S3-1, prior to the configuring the reporting of the UE, receiving information from the management entity 2003 defining the at least one of the periodicity of the reporting, the triggering events of the reporting, and the measurements comprised in the reporting.

To sum up, the eNB 2002 may need to configure the reporting of the RACH measurements, for which the RRC Connection Reconfiguration message may be used. The eNB 2002 may configure the periodicity of the reporting or triggers for the reporting, optionally also the required measurements.

FIG. 5A shows a first part of a data structure embodiment. In detail, there is provided a data structure 300 for storing measurements related to RA attempts from a UE 2001 towards an eNB 2002. The data structure 300 comprises at least one field UEF1 to UEF6; eNBF1 to eNBF6 configured to store at least one measurement from each single one of a plurality of the RA attempts, the data structure serving as a container for subsequent reporting to a management entity 2003.

More precisely, the at least one field may comprise at least one of a first UE field UEF1 configured to store the first UE measurement UEM1, a second UE field UEF2 configured to store the second UE measurement UEM2, a third UE field UEF3 configured to store the third UE measurement UEM3, a fourth UE field UEF4 configured to store the fourth UE measurement UEM4, a fifth UE field UEF5 configured to store the fifth UE measurement UEM5, and a sixth UE field UEF6 configured to store the sixth UE measurement UEM6.

FIG. 5B shows a second part of a data structure embodiment. More precisely, the at least one field may comprise at least one of a first eNB field eNBF1 configured to store the first eNB measurement eNBM1, a second eNB field eNBF2 configured to store the second eNB measurement eNBM2, a third eNB field eNBF3 configured to store the third eNB measurement eNBM3, a fourth eNB field eNBF4 configured to store the fourth eNB measurement eNBM4, a fifth eNB field eNBF5 configured to store the fifth eNB measurement eNBM5, and a sixth eNB field eNBF6 configured to store the sixth eNB measurement eNBM6.

Still further, the data structure 300 may comprise a RRC Measurement Report comprising at least the UE fields UEF1 to UEF6. Alternatively, the data structure 300 may comprise one of an MDT TraceRecord comprising at least the UE fields UEF1 to UEF6 and the eNB fields eNBF1 to eNBF6.

The present disclosure targets, inter alia, at RACH performance monitoring and root cause analysis of different RACH failures. Without being restricted thereto, the present disclosure may be summarized to provide new measurements to be collected and reported by both the UE 2001 and the eNB 2002 to be able to monitor the performance of the RACH, to have detailed failure statistics, and to identify the root causes of the different failures. The proposed UE measurement report contains information on all RACH attempts and provides statistics on the number of transmitted and received messages in the random access procedure, and on whether contention is detected during any RACH attempt. Similarly, the eNB 2002 may collect statistics on the number of received and sent messages including preamble detection failures. Different options are proposed to aggregate and report these measurements towards the management entity 2003. In other words, the RRC failure report provides information only on the last unsuccessful RRC attempt. New measurements to be logged at the eNB 2002 and the UE 2001 (see FIG. 5A and FIG. 5B, respectively) each time an RRC connection setup is initiated, not only the last attempt. These measurements are not included in the existing RRC measurement report.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for reporting measurements related to Random Access (RA) attempts from one or more user equipment (UEs) towards an evolved node B (eNB) in a cellular network, the method comprising:
configuring reporting of a particular UE of the one or more UEs, by receiving reporting configuration information, from a management entity, in terms of a periodicity of the reporting;

in response to the configuring, collecting at least one measurement from each single one of a plurality of the RA attempts, wherein at least a portion of the plurality of the RA attempts are contention-free RA attempts that occur after the particular-UE is connected to the eNB, and wherein the collected measurements from the plurality of the RA attempts comprise a first measurement of a total number of RA responses received by the particular UE; and in response to occurrence of a reporting event, reporting the collected measurements from the plurality of the RA attempts to the eNB or to the management entity in the cellular network, wherein the reporting event occurs while the particular UE is connected to the eNB and comprises at least one of:

detection of an imminent handover of the particular UE; and transmission of a handover measurement by the particular UE.

2. The method of claim 1, wherein the management entity is different from the one or more UEs and the eNB.

3. The method of claim 1, wherein the collecting step is performed separately depending on an initiation event that initiated each single RA attempt of the plurality of the RA attempts.

4. The method of claim 1, wherein:

each single RA attempt of the plurality of the RA attempts comprises one or more messages exchanged between the eNB and the particular UE; and collecting the measurements further comprises aggregating statistics on the one or more messages across the plurality of the RA attempts.

5. The method of claim 4, wherein the method is performed by the particular UE.

6. The method of claim 5, wherein the collected measurements from the plurality of the RA attempts further comprise at least one of the following measurements, with respect to a period since the last reporting of the collected measurements:

a second measurement of a total number of RA preambles transmitted by the particular UE since the last reporting step was performed;

a third measurement of a total number of messages 3 (Msg3s), containing a unique identifier (ID) of the particular UE, that were transmitted by the particular UE since the last reporting step was performed;

a fourth measurement of a total number of Hybrid Automatic Repeat request (HARM) re-transmissions that occurred during transmission of the total number of Msg3s; and a fifth measurement of a total number of contentions detected by the particular UE since the last reporting step was performed.

7. The method of claim 6, wherein:

the second measurement comprises a total number of contention-free RA preambles transmitted by the particular UE, corresponding to the portion of the plurality of the RA attempts that are the contention-free RA attempts; and the first measurement comprises a total number of contention-free RA responses received by the particular UE, corresponding to the portion of the plurality of the RA attempts that are the contention-free RA attempts.

8. The method of claim 5, wherein the aggregated statistics further comprise reports on at least one of the following failure conditions:

a second failure condition indicating that the particular UE has been unable to receive a scheduling request in response to a transmitting RA preamble; and a fourth failure condition indicating that the particular UE has been unable to receive a message 4 (Msg4) or to detect a unique identifier (ID) of the particular UE in a received Msg4.

9. The method of claim 5, further comprising, receiving, from the eNB, the reporting configuration information pertaining to at least one of:

triggering events of the reporting; and the measurements comprised in the reporting.

10. The method of claim 5, wherein reporting the collected measurements is performed using one of:

a UEInformationTransfer procedure; and a Radio Resource Control (RRC) Measurement Report procedure utilizing added Information Elements (IEs).

11. The method of claim 4, wherein the method is performed by the eNB, and the eNB reports the collected measurements to the management entity.

12. The method of claim 11, wherein the aggregated statistics further comprise reports on at least one of the following failure conditions:

a first failure condition indicating that the eNB has been unable to detect a transmitted RA preamble; and a third failure condition indicating that the eNB has been unable to receive a message 3 (Msg3) containing a unique identifier (ID) of the particular UE.

13. The method of claim 11, wherein the collected measurements from the plurality of the RA attempts comprise at least one of the following measurements, with respect to a period since the last reporting of the collected measurements:

a second measurement of a total number of RA preambles detected by the eNB;

a third measurement of a total number of messages 3 (Msg3s), containing a unique identifier (ID) of the particular UE, received by the eNB; and a fourth measurement of a total number of transmitted messages 4 (Msg4s) comprising another unique ID inserted by the eNB.

14. The method of claim 13, wherein:

the second measurement comprises a total number of contention-free RA preambles detected by the eNB, corresponding to the portion of the plurality of the RA attempts that are the contention-free RA attempts; and the first measurement comprises a total number of contention-free RA responses transmitted by the eNB, corresponding to the portion of the plurality of the RA attempts that are the contention-free RA attempts.

15. The method of claim 11, wherein the collecting step is performed with a period identical to a reporting period corresponding to the particular UE.

16. The method of claim 11, further comprising transmitting, to the one or more UEs, the reporting configuration information pertaining to at least one of:

triggering events of the reporting; and the measurements comprised in the reporting.

17. The method of claim 16, wherein transmitting the reporting configuration information is performed using one of the following:

one or more Radio Resource Control (RRC) Connection Reconfiguration messages; and a Minimization of Drive Tests (MDT) TraceJob configuration procedure.

18. The method of claim 16, further comprising, prior to transmitting the reporting configuration information, receiving at least a portion of the reporting configuration information from the management entity.

19. The method of claim 11, wherein the eNB reports the collected measurements in a trace record of a Minimization of Drive Tests (MDT) trace procedure.

20. The method of claim 11, wherein the collected measurements from the plurality of the RA attempts comprise at least one of the following measurements:
   a measurement of a total number of Radio Resource Control (RRC) Connection Completed messages received by the eNB from the particular UE; and
   a measurement of a total number of RRC Connection Reject messages transmitted from the eNB to the particular UE.

21. The method of claim 11, wherein the aggregated statistics comprise at least one of the following, with respect to a period since the last reporting of the collected measurements:
   a percentage of successful preamble detections, being a quotient of:
      a total number of RA preambles transmitted by all of the one or more UEs, in a cell, served by the eNB; and
      a total number of RA preambles detected by the eNB in the cell since the last reporting step was performed;
   a percentage of successful preamble transmissions, being a quotient of:
      the total number of RA preambles transmitted by all of the one or more UEs in the cell; and
      a total number of RA responses transmitted by the eNB in the cell;
   a percentage of contentions detected for each of the one or more UEs, being a quotient of:
      a total number of transmitted messages 4 (Msg4s) for the particular UE comprising another unique identifier (ID) inserted by the eNB; and
      a total number of contentions detected by the particular UE; and
   a percentage of contentions detected per cell, being a quotient of:
      a total number of transmitted Msg4s for all of the one or more UEs in the cell; and
      a total number of contentions detected by all of the one or more UEs in the cell.

22. The method according to claim 11, wherein aggregating the statistics and reporting the collected measurements are performed once per one of: UE context and cell statistics.

23. A non-transitory computer readable storage medium storing a computer program for reporting measurements related to Random Access (RA) attempts from one or more user equipment (UEs) towards an evolved node B (eNB), the computer program comprising program code that, when executed by a processor, configures the processor to perform operations comprising:
   configuring reporting of a particular UE, of the one or more UEs, in terms of triggering events of the reporting;
   in response to the configuring, collecting at least one measurement from each single one of a plurality of the RA attempts, wherein at least a portion of the plurality of the RA attempts are contention-free RA attempts that occur after the particular UE is connected to the eNB, wherein collecting the measurements comprises aggregating statistics on one or more messages across the plurality of the RA attempts, and wherein the aggregated statistics comprise:
      a percentage of successful preamble detections, being a quotient of:
         a total number of RA preambles transmitted by all of the one or more UEs, in a cell, served by the eNB; and
         a total number of RA preambles detected by the eNB in the cell; and
   in response to occurrence of a reporting event, reporting the collected measurements from the plurality of the RA attempts to a management entity in a cellular network, wherein the reporting event occurs while the particular UE is connected to the eNB and comprises at least one of:
      detection of an imminent handover of the particular UE; and
      transmission of a handover measurement by the particular UE.

24. A User Equipment (UE) for reporting measurements related to Random Access (RA) attempts from the UE towards an evolved node B (eNB), the UE comprising a processor and at least one memory storing computer-executable instructions that, when executed by the processor, configure the UE to:
   configure reporting of the UE in terms of a periodicity of the reporting;
   in response to the configuration, collect at least one measurement from each single one of a plurality of the RA attempts, wherein at least a portion of the plurality of the RA attempts are contention-free RA attempts that occur after the UE is connected to the eNB; and
   in response to occurrence of a reporting event, report the collected measurements from the plurality of the RA attempts to the eNB or to a management entity in a cellular network, wherein the collected measurements are reported to determine aggregated statistics that comprise:
      a percentage of successful preamble detections, being a quotient of:
         a total number of RA preambles transmitted by the UE, in a cell, served by the eNB; and
         a total number of RA preambles detected by the eNB in the cell,
   wherein the reporting event occurs while the UE is connected to the eNB and comprises at least one of:
      detection of an imminent handover of the UE; and
      transmission of a handover measurement by the UE.

25. An evolved Node B (eNB) for reporting measurements related to Random Access (RA) attempts from one or more User Equipment (UEs) towards the eNB, the eNB comprising a processor and at least one memory storing computer-executable instructions that, when executed by the processor, configure the eNB to:
   configure reporting of a particular UE, of the one or more UEs, in terms of triggering events of the reporting;
   in response to the configuration, collect at least one measurement from each single one of a plurality of the RA attempts, wherein at least a portion of the plurality of the RA attempts are contention-free RA attempts that occur after the particular UE is connected to the eNB, wherein the collection of the measurements comprises aggregation of statistics on one or more messages across the plurality of the RA attempts, and wherein the aggregated statistics comprise:

a percentage of successful preamble transmissions, being a quotient of:
   a total number of RA preambles transmitted by all of the one or more UEs in a cell; and
   a total number of RA responses transmitted by the eNB in the cell; and
report the collected measurements from the plurality of the RA attempts to a management entity in a cellular network.

* * * * *